(12) United States Patent
Yoshida et al.

(10) Patent No.: US 11,731,531 B2
(45) Date of Patent: Aug. 22, 2023

(54) COOLING SYSTEM FOR POWER STORAGE

(71) Applicant: TOYOTA JIDOSHA KABUSHIKI KAISHA, Toyota (JP)

(72) Inventors: Hiroshi Yoshida, Anjo (JP); Nobuyuki Tanaka, Toyota (JP); Kazuki Kubo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 299 days.

(21) Appl. No.: 17/072,353

(22) Filed: Oct. 16, 2020

(65) Prior Publication Data
US 2021/0138931 A1    May 13, 2021

(30) Foreign Application Priority Data
Nov. 7, 2019    (JP) .................................. 2019-202460

(51) Int. Cl.
*B60L 58/12*    (2019.01)
*H01M 10/625*    (2014.01)
*B60L 58/26*    (2019.01)

(52) U.S. Cl.
CPC .............. *B60L 58/26* (2019.02); *B60L 58/12* (2019.02); *H01M 10/625* (2015.04)

(58) Field of Classification Search
CPC ........ B60L 58/26; B60L 58/12; H01M 10/625
See application file for complete search history.

(56) References Cited

U.S. PATENT DOCUMENTS

2008/0257624 A1 * 10/2008 Kubo ..................... B60L 58/26
                                                              180/68.1
2018/0111495 A1    4/2018 Kinomura

FOREIGN PATENT DOCUMENTS

| JP | 2009-199870 A | | 9/2009 |
| JP | 2015-37015 A | | 2/2015 |
| JP | 201685804 | * | 5/2016 |
| JP | 2018-74673 A | | 5/2018 |
| WO | WO 2013008368 A1 | * | 2/2015 |

OTHER PUBLICATIONS

JP 201685804 MT (Year: 2016).*
Decision to Grant a Patent by JPO (dated 2022).*

* cited by examiner

*Primary Examiner* — Alexander Usyatinsky
(74) *Attorney, Agent, or Firm* — Sughrue Mion, PLLC

(57) ABSTRACT

An ECU performs processing including obtaining a full charge capacity when a cooling apparatus remains stopped, showing textual information that inquires about whether or not cooling can be carried out when a battery temperature is equal to or lower than a threshold value TB(1), when the full charge capacity is equal to or lower than a threshold value C(1), and when the battery temperature is equal to or higher than a threshold value TB(2), carrying out battery cooling control when a request for carrying out cooling has been issued, and maintaining a standstill state of the cooling apparatus when no request for carrying out cooling has been issued.

13 Claims, 11 Drawing Sheets

FIG.6

| FULL CHARGE CAPACITY [Ah] | 30 | 25 | 20 | 15 | 10 |
|---|---|---|---|---|---|
| RATE OF INCREASE IN NUMBER OF ROTATIONS OF BLOWER [%] | 0 | 10 | 20 | 50 | 100 |

FIG.8

| FULL CHARGE CAPACITY [Ah] | 30 | 25 | 20 | 15 | 10 |
|---|---|---|---|---|---|
| RATE OF INCREASE IN BATTERY COOLING [%] | 0 | 10 | 20 | 50 | 100 |

COOLING SYSTEM FOR POWER STORAGE

This nonprovisional application is based on Japanese Patent Application No. 2019-202460 filed with the Japan Patent Office on Nov. 7, 2019, the entire contents of which are hereby incorporated by reference.

BACKGROUND

Field

The present disclosure relates to a cooling system for a power storage.

Description of the Background Art

An electrically powered vehicle such as an electric vehicle or a hybrid vehicle that travels with electric power incorporates a power storage such as a secondary battery that stores electric energy. The power storage generates heat by being charged or discharging. When a temperature of the power storage becomes high, loss may increase or deterioration may be accelerated due to increase in internal resistance. Therefore, the electrically powered vehicle incorporating the power storage may incorporate a cooling system for the power storage. When the cooling system is activated, noise is generated. Therefore, the cooling system is desirably activated at appropriate timing.

For example, Japanese Patent Laying-Open No. 2009-199870 discloses a technique to delay, when a secondary battery still has sufficient life, cooling timing by shifting a temperature at which an operation of a battery cooling fan is switched toward a higher side depending on the life.

SUMMARY

Users are various in their valued product characteristics of the electrically powered vehicle; some users place importance on quiet performance of the electrically powered vehicle and others place importance on longer life of a power storage. Therefore, improvement in quiet performance by delaying cooling timing or extension of life by advancing cooling timing regardless of product characteristics on which a user places importance may not lead to execution of control of the cooling system in conformity with product characteristics on which the user places importance.

An object of the present disclosure is to provide a cooling system capable of carrying out control in conformity with product characteristics on which a user places importance.

A cooling system for a power storage according to one aspect of the present disclosure is a cooling system for a power storage used for supply of electric power to a drive source of a vehicle. The cooling system includes a cooling apparatus that cools the power storage, a notification apparatus that provides prescribed information in a compartment of the vehicle, and a control device that controls the cooling apparatus and the notification apparatus. When an execution condition relating to cooling of the power storage is satisfied during stoppage of the cooling apparatus, the control device provides inquiry information through the notification apparatus, the inquiry information representing whether or not cooling of the power storage with the cooling apparatus is carried out.

Thus, when an execution condition is satisfied during stoppage of the cooling apparatus, an inquiry about whether or not cooling of the power storage with the cooling apparatus can be carried out is issued to a user through the notification apparatus. Therefore, control of the cooling apparatus as requested by a user can be carried out.

In one embodiment, the execution condition includes a condition that a temperature of the power storage is equal to or lower than a first temperature.

Thus, an inquiry about whether or not cooling of the power storage with the cooling apparatus can be carried out in accordance with a temperature condition of the power storage is issued to a user through the notification apparatus. Therefore, control of the cooling apparatus as requested by a user can be carried out.

In another embodiment, the control device can obtain a full charge capacity of the power storage, and when the full charge capacity is equal to or lower than a prescribed threshold value and when the execution condition is satisfied, the control device provides the inquiry information through the notification apparatus.

For example, when the power storage is almost brand-new, representation of a range of a vehicle does not much vary and hence a user is less likely to notice lowering in full charge capacity. Frequent representation of inquiry information as to whether or not cooling can be carried out during such a period may sometimes make the user feel bothered and product characteristics as preferred by the user may not be achieved. Therefore, by providing inquiry information on condition that the execution condition is satisfied at the time when the full charge capacity becomes equal to or lower than a threshold value, control of the cooling system further in conformity with product characteristics on which the user places importance can be provided.

In yet another embodiment, the cooling system further includes an operation apparatus that accepts an operation by a user. When the operation apparatus accepts a cooling execution operation that requests for execution of cooling of the power storage in response to the inquiry information, the control device carries out cooling of the power storage with the cooling apparatus.

Thus, as the user performs the cooling execution operation in response to the inquiry information, control of the cooling apparatus as requested by the user can be carried out.

In yet another embodiment, the cooling system further includes an operation apparatus that accepts an operation by a user. When the operation apparatus accepts a cooling non-execution operation that requests for non-execution of cooling of the power storage in response to the inquiry information, the control device does not carry out cooling of the power storage with the cooling apparatus.

Thus, as the user performs the cooling non-execution operation in response to the inquiry information, control of the cooling apparatus as requested by the user can be carried out.

In yet another embodiment, when the operation apparatus accepts the cooling execution operation and thereafter the execution condition is not satisfied and again satisfied, the cooling execution operation accepted by the operation apparatus is retrieved and the control device carries out cooling of the power storage based on the cooling execution operation accepted again by the operation apparatus, and when the operation apparatus accepts a cooling non-execution operation and thereafter the execution condition is not satisfied and again satisfied, the cooling non-execution operation accepted by the operation apparatus is retrieved and the control device does not carry out cooling of the power storage based on the cooling non-execution operation accepted again by the operation apparatus.

Depending on a state of the power storage, satisfaction and non-satisfaction of the execution condition may frequently be repeated. Providing the user with inquiry information each time the execution condition is satisfied may make the user feel bothered, and product characteristics as preferred by the user may not be achieved. Therefore, when the execution condition is thus again satisfied, cooling of the power storage is carried out or not carried out as following the previous operation, so that control of the cooling system further in conformity with product characteristics on which the user places importance can be provided.

In yet another embodiment, when trip of the vehicle ends, the control device resets information representing the operation previously accepted by the operation apparatus.

When a record of operations up to the end of the present trip remains at the time of start of a next trip, execution or non-execution of cooling is continued based on information on an initial operation, and product characteristics as preferred by the user may not be achieved. Therefore, by thus resetting at the time of the end of a trip, the operation previously accepted by the operation apparatus, a situation as above can be avoided and control of the cooling system further in conformity with product characteristics on which the user places importance can be provided.

In yet another embodiment, when the operation apparatus accepts the cooling execution operation and thereafter accepts an additional operation, based on the additional operation, the control device carries out cooling of the power storage on condition that the execution condition is satisfied, and when the operation apparatus accepts the cooling non-execution operation and thereafter accepts an additional operation, based on the additional operation, the control device does not carry out cooling of the power storage on condition that the execution condition is satisfied.

For example, during a trip of a vehicle, user's mind may change or the user may perform a misoperation, and the user may perform an operation different from an intended operation. If no change from the previous operation can be made in such a case, product characteristics as preferred by the user may not be achieved. Therefore, when an operation is again performed after the previous operation, cooling is carried out or not carried out based on the most recent operation, so that control of the cooling system further in conformity with product characteristics on which the user places importance can be provided.

In yet another embodiment, when the power storage is in an abnormal condition, the control device carries out cooling of the power storage with the cooling apparatus without providing the inquiry information.

Thus, when the power storage is in the abnormal condition, cooling of the power storage is forcibly carried out. Therefore, possibility of failure or deterioration of the power storage can be lowered.

In yet another embodiment, when a temperature of the power storage is equal to or lower than a first temperature and higher than a second temperature, the control device provides the inquiry information. When the temperature of the power storage is higher than the first temperature, the control device carries out cooling of the power storage with the cooling apparatus without providing the inquiry information.

Thus, when the temperature of the power storage is high, cooling of the power storage is forcibly carried out. Therefore, possibility of failure or deterioration of the power storage can be lowered.

In yet another embodiment, the control device provides information that represents at least any of an advantage and a disadvantage in carrying out cooling, in addition to the inquiry information.

Thus, the user can recognize an advantage and a disadvantage in carrying out cooling.

In yet another embodiment, the control device provides information that represents at least any of an advantage and a disadvantage in not carrying out cooling, in addition to the inquiry information.

Thus, the user can recognize an advantage and a disadvantage in not carrying out cooling.

In yet another embodiment, when the control device has carried out cooling of the power storage with the cooling apparatus without providing the inquiry information, the control device provides, through the notification apparatus, information indicating that cooling of the power storage has been carried out.

Thus, strange feeling felt by the user due to activation of the cooling apparatus unintended by the user can be suppressed.

In yet another embodiment, when the execution condition is satisfied during cooling by the cooling apparatus, the control device provides, through the notification apparatus, information that inquires about whether or not a performance level of the cooling apparatus can be raised.

Thus, when the execution condition is satisfied while the cooling apparatus is active, an inquiry about whether or not a performance level of the cooling apparatus can be raised is issued to the user through the notification apparatus. Therefore, control of the cooling apparatus as requested by the user can be carried out.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6 is a diagram showing in a table format, an exemplary predetermined map showing relation between a full charge capacity and a rate of increase in number of rotations of a blower.

FIG. 8 is a diagram showing in a table format, an exemplary predetermined map showing relation between a full charge capacity and a rate of increase in battery cooling.

DESCRIPTION OF THE PREFERRED EMBODIMENTS

Figure 1:
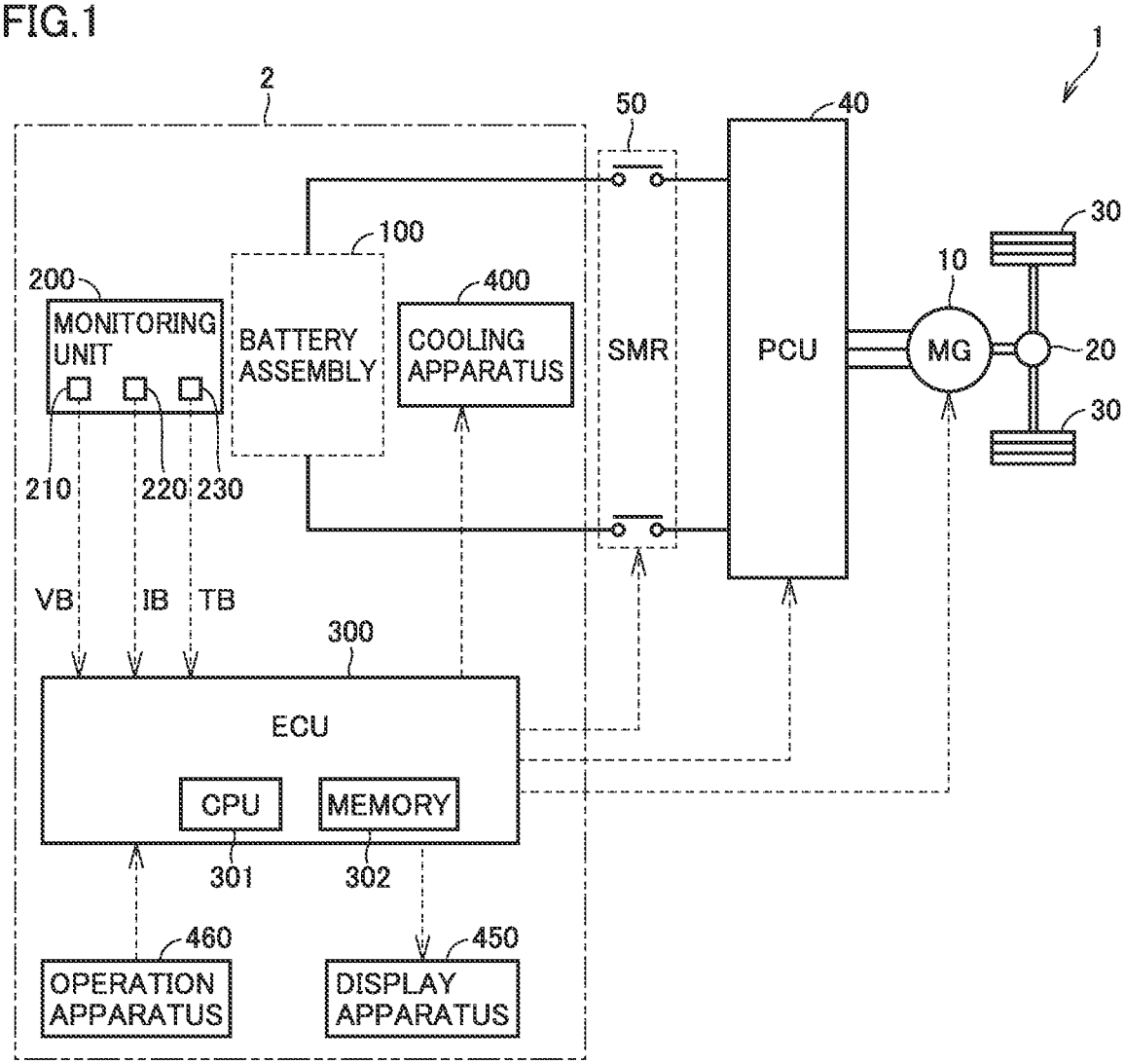
FIG. 1 is a diagram showing an exemplary configuration of a vehicle incorporating a cooling system.

An embodiment of the present disclosure will be described below in detail with reference to the drawings. The same or corresponding elements in the drawings have the same reference characters allotted and description thereof will not be repeated.

An example in which a cooling system for a power storage according to an embodiment of the present disclosure is mounted on a vehicle will be described below by way of example. FIG. 1 is a diagram showing an exemplary configuration of a vehicle 1 incorporating a cooling system 2.

In the present embodiment, for example, an electric vehicle is adopted as vehicle 1. Vehicle 1 includes cooling system 2, a motor generator (MG) 10, a power transmission gear 20, a drive wheel 30, a power control unit (PCU) 40, and a system main relay (SMR) 50. In the present embodiment, cooling system 2 includes a battery assembly 100, a monitoring unit 200, an electronic control unit (ECU) 300, a cooling apparatus 400, a display apparatus 450, and an operation apparatus 460.

MG 10 is implemented, for example, by a three-phase alternating-current (AC) rotating electric machine, and performs a function as a motor and a function as a generator. Output torque from MG 10 is transmitted to drive wheel 30 through power transmission gear 20 including a reduction gear and a differential.

During braking of vehicle 1, MG 10 is driven by drive wheel 30 and MG 10 operates as the generator. MG 10 thus functions also as a braking apparatus that carries out regenerative braking that converts kinetic energy of vehicle 1 into electric power. Regenerated power generated from regenerative braking force in MG 10 is stored in battery assembly 100. Though FIG. 1 shows a configuration in which only a single MG is provided, the number of MGs is not limited thereto and a plurality of (for example, two) MGs may be provided.

PCU 40 is a power conversion apparatus that bidirectionally converts electric power between MG 10 and battery assembly 100. PCU 40 includes, for example, an inverter and a converter (neither of which is shown) that operate based on a control signal from ECU 300.

During discharging of battery assembly 100, the converter up-converts a voltage supplied from battery assembly 100 and supplies the resultant voltage to the inverter. The inverter converts direct-current (DC) power supplied from the converter into AC power to drive MG 10.

During charging of battery assembly 100, the inverter converts AC power generated by MG 10 into DC power and supplies DC power to the converter. The converter down-converts a voltage supplied from the inverter to a voltage suitable for charging of battery assembly 100 and supplies the resultant voltage to battery assembly 100.

PCU 40 suspends charging and discharging by stopping the operation of the inverter and the converter based on a control signal from ECU 300. PCU 40 may include no converter.

SMR 50 is electrically connected to a power line that connects battery assembly 100 and PCU 40 to each other. When SMR 50 is closed (that is, a conducting state is established) in response to a control signal from ECU 300, electric power may be supplied and received between battery assembly 100 and PCU 40. When SMR 50 is open (that is, disconnected) in response to a control signal from ECU 300, battery assembly 100 and PCU 40 are electrically disconnected from each other.

Battery assembly 100 is a rechargeable DC power supply, and implemented, for example, by a secondary battery such as a nickel metal hydride battery or a lithium ion battery containing a solid or liquid electrolyte. Battery assembly 100 includes, for example, a plurality of cells of the secondary battery as power storage elements.

Monitoring unit 200 includes a voltage detector 210, a current detector 220, and a temperature detector 230. Voltage detector 210 detects a voltage VB across terminals of battery assembly 100. Current detector 220 detects a current IB input to and output from battery assembly 10. Temperature detector 230 detects a temperature TB of battery assembly 100. Each detector outputs a result of detection to ECU 300.

ECU 300 includes a central processing unit (CPU) 301 and a memory (including, for example, a read only memory (ROM) or a random access memory (RAM)) 302. ECU 300 controls each device such that vehicle 1 is in a desired state, based on a signal received from monitoring unit 200 or information such as a map or a program stored in memory 302. Various types of control carried out by ECU 300 can also be carried out by dedicated hardware (electronic circuitry) without being limited to processing by software.

Cooling apparatus 400 cools battery assembly 100. Cooling apparatus 400 is constituted, for example, of an intake duct that connects the inside of a compartment and a housing of battery assembly 100 to each other and a blower capable of supplying air in the compartment into the housing of battery assembly 100. The blower may be provided in the intake duct or in an exhaust duct through which air in the housing of battery assembly 100 is exhausted to the outside of the vehicle. Cooling apparatus 400 is activated in response to a control signal from ECU 300. When air in the compartment is supplied into the housing of battery assembly 100 as a result of activation of cooling apparatus 400, air supplied into battery assembly 100 exchanges heat with battery assembly 100 and is thereafter emitted to the outside through the exhaust duct.

Display apparatus 450 is provided, for example, at a position visually recognizable by a driver who takes a seat in the compartment of vehicle 1. Display apparatus 450 is implemented, for example, by a liquid crystal display or an organic electro-luminescence (EL) display. Display apparatus 450 shows prescribed information in response to a control signal from ECU 300.

Operation apparatus 460 is implemented, for example, by a touch panel provided on a display screen of display apparatus 450. An operation signal generated by an operation by a user onto operation apparatus 460 is transmitted to ECU 300.

In vehicle 1 configured as above, battery assembly 100 generates heat by being charged or discharging. When a temperature of the battery assembly becomes high, loss may increase or deterioration may be accelerated due to increase in internal resistance. Therefore, vehicle 1 incorporating battery assembly 100 incorporates cooling system 2 that cools battery assembly 100. When cooling system 2 is activated, however, noise is generated. Therefore, timing of activation of cooling system 2 may be set in accordance with a state of deterioration of battery assembly 100.

Users are various in their valued product characteristics of vehicle 1; some users place importance on quiet performance of vehicle 1 and others place importance on longer life of battery assembly 100. Therefore, improvement in quiet performance by delaying cooling timing or extension of life by advancing cooling timing regardless of product characteristics on which a user places importance may not lead to execution of control of cooling system 2 in conformity with product characteristics on which the user places importance.

In the present embodiment, when a cooling execution condition relating to cooling of battery assembly 100 is satisfied while cooling apparatus 400 remains stopped, ECU 300 provides through display apparatus 450, inquiry information that represents whether or not cooling of battery assembly 100 with cooling apparatus 400 can be carried out. The execution condition includes, for example, a condition that a battery temperature TB is equal to or lower than a threshold value TB(1).

By doing so, when the execution condition is satisfied while cooling apparatus 400 remains stopped, an inquiry about whether or not cooling of battery assembly 100 with cooling apparatus 400 can be carried out is issued to a user through display apparatus 450. Therefore, control of cooling apparatus 400 as requested by the user can be carried out.

Figure 2:
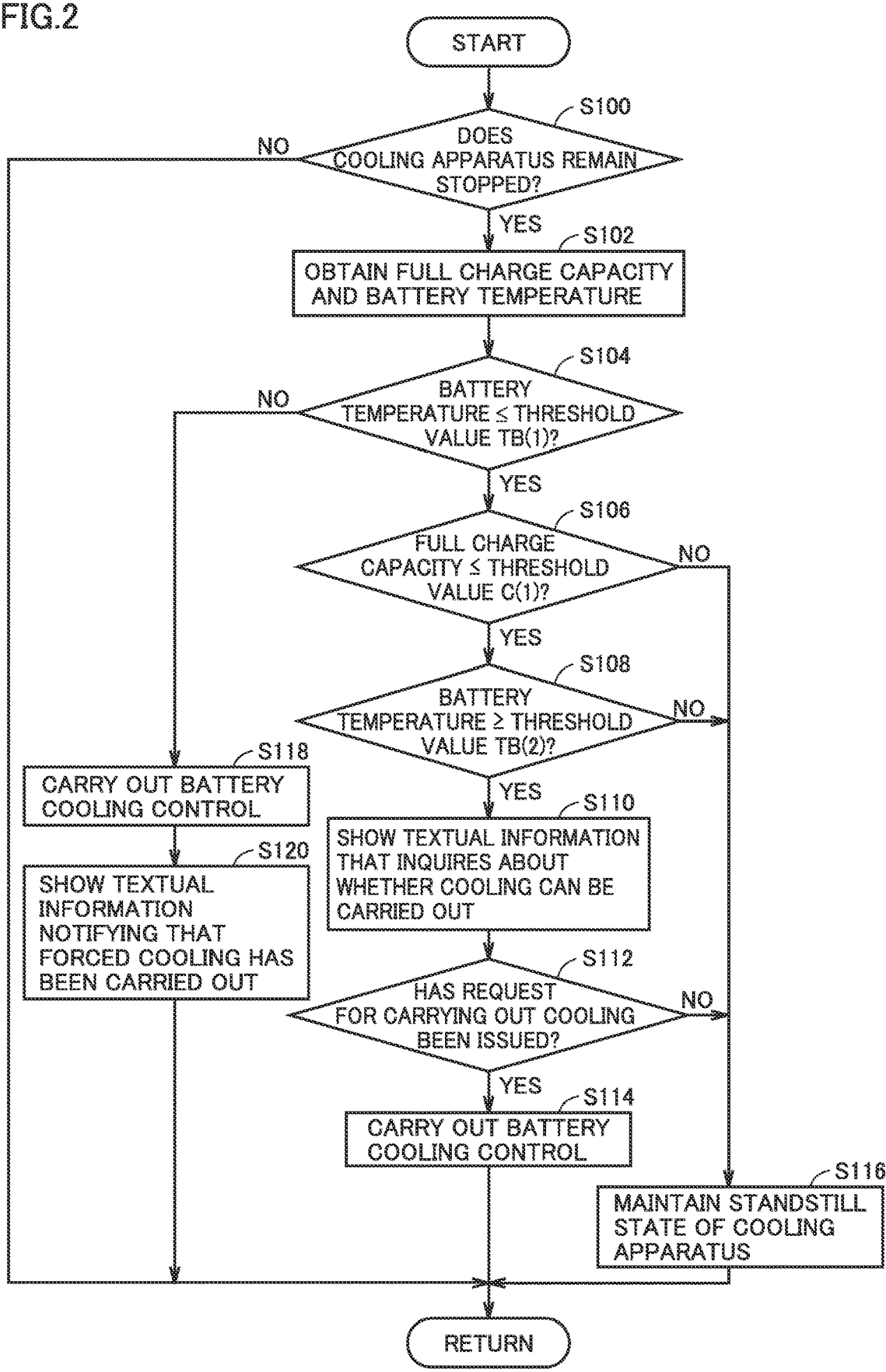
FIG. 2 is a flowchart showing exemplary processing for inquiring about whether or not battery cooling can be carried out.

Exemplary control processing performed by ECU 300 will be described below with reference to FIG. 2. FIG. 2 is a flowchart showing exemplary processing for inquiring about whether or not battery cooling can be carried out. A series of processing shown in this flowchart is repeatedly performed by ECU 300 every prescribed control period.

In step (which is denoted as S below) 100, ECU 300 determines whether or not cooling apparatus 400 remains stopped. For example, when an activation flag turned on at the time of activation of cooling apparatus 400 is off, ECU 300 may determine that cooling apparatus 400 remains stopped, or when a control signal that activates a blower is not being output to cooling apparatus 400, ECU 300 may determine that cooling apparatus 400 remains stopped. When cooling apparatus 400 is determined as remaining stopped (YES in S100), the process proceeds to S102.

In S102, ECU 300 obtains the full charge capacity and battery temperature TB of battery assembly 100. For example, ECU 300 may estimate the full charge capacity of battery assembly 100 from variation in SOC and a sum of charging and discharging currents during a period until lapse of a certain period since previous obtainment of the full charge capacity.

Alternatively, for example, ECU 300 may find a distribution of frequency of use in a plurality of use regions classified based on a temperature and an SOC of battery assembly 100, calculate a degree of progress of deterioration in each region from the found frequency distribution, and estimate the current full charge capacity based on an amount of lowering in capacity retention calculated from the degree of progress of deterioration and a duration of use in each region. Without being limited to the method described above, a known technique may be applied as a method of estimating the full charge capacity of battery assembly 100.

Furthermore, ECU 300 obtains battery temperature TB, for example, based on a result of detection by temperature detector 230.

In S104, ECU 300 determines whether or not battery temperature TB of battery assembly 100 is equal to or lower than threshold value TB(1). Threshold value TB(1) is, for example, a predetermined value for determining whether or not battery assembly 100 is in a high-temperature state in which forced cooling of battery assembly 100 is required. Threshold value TB(1) is adapted to an appropriate value through experiments. When battery temperature TB of battery assembly 100 is determined as being equal to or lower than threshold value TB(1) (YES in S104), the process proceeds to S106.

In S106, ECU 300 determines whether or not the full charge capacity of battery assembly 100 is equal to or lower than a threshold value C(1). Threshold value C(1) is, for example, a predetermined value that represents a full charge capacity at which cooling is desirably carried out due to increase in internal resistance as compared with an example where the full charge capacity is at an initial value, and is adapted to an appropriate value through experiments. When the full charge capacity is determined as being equal to or lower than threshold value C(1) (YES in S106), the process proceeds to S108.

In S108, ECU 300 determines whether or not battery temperature TB of battery assembly 100 is equal to or higher than a threshold value TB(2). Threshold value TB(2) is, for example, a predetermined value for determining whether or not battery assembly 100 is in a temperature region where cooling of battery assembly 100 is required. Threshold value TB(2) is adapted to an appropriate value through experiments. When battery temperature TB of battery assembly 100 is determined as being equal to or higher than threshold value TB(2) (YES in S108), the process proceeds to S110.

In S110, ECU 300 controls display apparatus 450 to show textual information (inquiry information) that inquires about whether or not cooling can be carried out.

Figure 3:
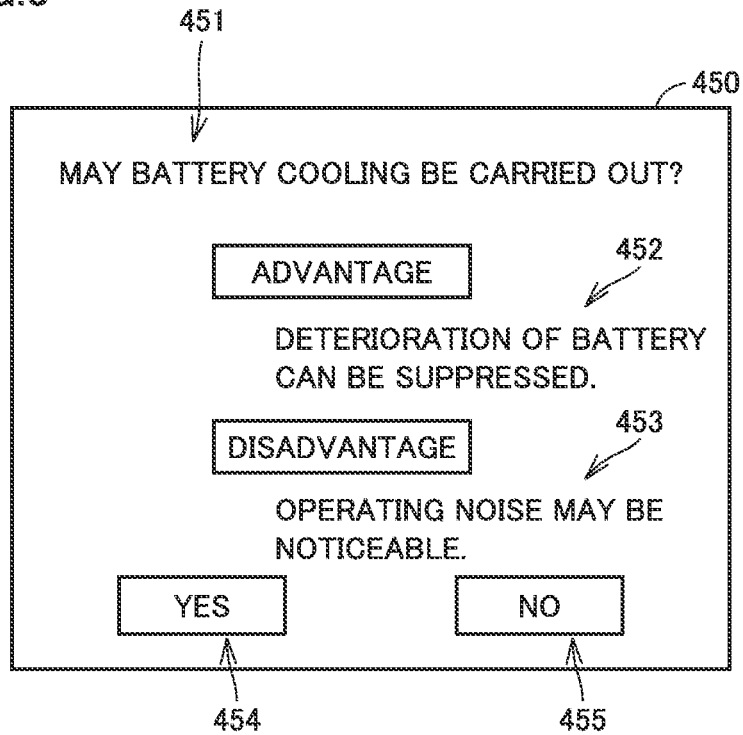
FIG. 3 is a diagram showing exemplary representation on a display apparatus, of textual information that inquires about whether or not cooling can be carried out.

FIG. 3 is a diagram showing exemplary representation on display apparatus 450, of textual information that inquires about whether or not cooling can be carried out. As shown in FIG. 3, in a first region 451 set at a top of a display screen of display apparatus 450, textual information "may battery cooling be carried out?" that represents an inquiry about whether or not cooling can be carried out is shown. The textual information that inquires about whether or not cooling can be carried out is not particularly limited to the textual information shown in FIG. 3 and a position where the textual information is shown is not limited to first region 451 either.

On the display screen, in addition to the textual information that inquires about whether or not cooling can be carried out, textual information that represents an advantage derived by carrying out battery cooling is shown in a second region 452 set below first region 451, and textual information that represents a disadvantage is shown in a third region 453 set below second region 452. The information that represents the advantage includes, for example, textual information "deterioration of battery can be suppressed." The information that represents the disadvantage includes, for example, textual information "operating noise may be noticeable." The information that represents the advantage and the information that represents the disadvantage are not particularly limited to such textual information.

A fourth region 454 and a fifth region 455 on the right of the fourth region are further set below third region 453. In fourth region 454, an image including a rectangular frame and textual information "YES" in the rectangular frame is shown. In fifth region 455, an image including a rectangular frame and textual information "NO" in the rectangular frame is shown.

In S112, ECU 300 determines whether or not a request for carrying out cooling has been issued. For example, when a user performs a touch operation onto a position corresponding to the image in fourth region 454 on a touch panel representing operation apparatus 460, ECU 300 may determine that the request for carrying out cooling has been issued. The touch operation onto the position corresponding to the image in fourth region 454 may be denoted as a cooling execution operation below. In addition, for example, when the user performs a touch operation onto a position corresponding to an image in fifth region 455 on the touch panel representing operation apparatus 460, ECU 300 may determine that no request for carrying out cooling has been issued. The touch operation onto the position corresponding to the image in fifth region 455 may be denoted as a cooling non-execution operation below. When it is determined that the request for carrying out cooling has been issued (YES in S112), the process proceeds to S114.

In S114, ECU 300 carries out battery cooling control. Specifically, ECU 300 controls cooling apparatus 400 to set a performance level (the number of rotations of a blower) in accordance with battery temperature TB of battery assembly 100. ECU 300 sets the performance level, for example, based on a map showing relation between battery temperature TB and the performance level of cooling apparatus 400 and on battery temperature TB. Relation between battery temperature TB and the performance level of cooling apparatus 400 is, for example, such that, as battery temperature TB is higher, the performance level of cooling apparatus 400 is higher. The map is stored in advance in memory 302 of ECU 300. When it is determined that no request for carrying out cooling has been issued (NO in S112), the process proceeds to S116.

In S116, ECU 300 maintains a standstill state of cooling apparatus 400. When battery temperature TB of battery assembly 100 is determined as being higher than threshold value TB(1) (NO in S104), the process proceeds to S118.

In S118, ECU 300 carries out battery cooling control. Since specific processing contents are the same as processing contents in battery cooling control carried out in S114, detailed description thereof will not be repeated.

Figure 4:
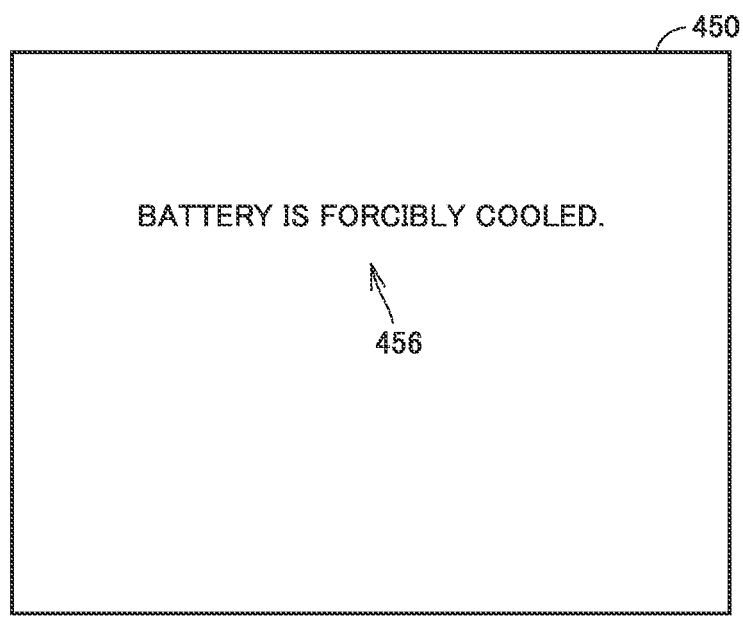
FIG. 4 is a diagram showing exemplary representation on the display apparatus, of textual information notifying that forced cooling is carried out.

In S120, ECU 300 has textual information shown, the textual information notifying that battery cooling control for battery assembly 100 has forcibly been carried out. FIG. 4 is a diagram showing exemplary representation on display apparatus 450, of textual information notifying that forced cooling is carried out. As shown in FIG. 4, in a sixth region 456 set at a central position of the display screen of display apparatus 450, textual information "battery is forcibly cooled" notifying that forced cooling is carried out is shown. The textual information notifying that forced cooling is carried out is not particularly limited to the textual information shown in FIG. 4, and the position where the textual information is shown is not particularly limited to the central position in the display screen either.

When cooling apparatus 400 is determined as not remaining stopped (NO in S100), this process ends. When the full charge capacity of battery assembly 100 is higher than threshold value C(1) (NO in S106) or when battery temperature TB of battery assembly 100 is lower than threshold value TB(2) (NO in S108), the process proceeds to S116.

When the execution condition relating to cooling of battery assembly 100 is satisfied while cooling apparatus 400 is active, ECU 300 provides through display apparatus 450, information that inquires about whether or not a performance level of cooling apparatus 400 can be raised. The execution condition on which determination is based while cooling apparatus 400 is active and the execution condition on which determination is based while cooling apparatus 400 remains stopped described above are different from each other.

Thus, when the execution condition is satisfied while cooling apparatus 400 is active, an inquiry about whether or not a quantity of cooling of battery assembly 100 can be increased is issued to a user through display apparatus 450. Therefore, control of cooling apparatus 400 as requested by the user can be carried out.

Figure 5:
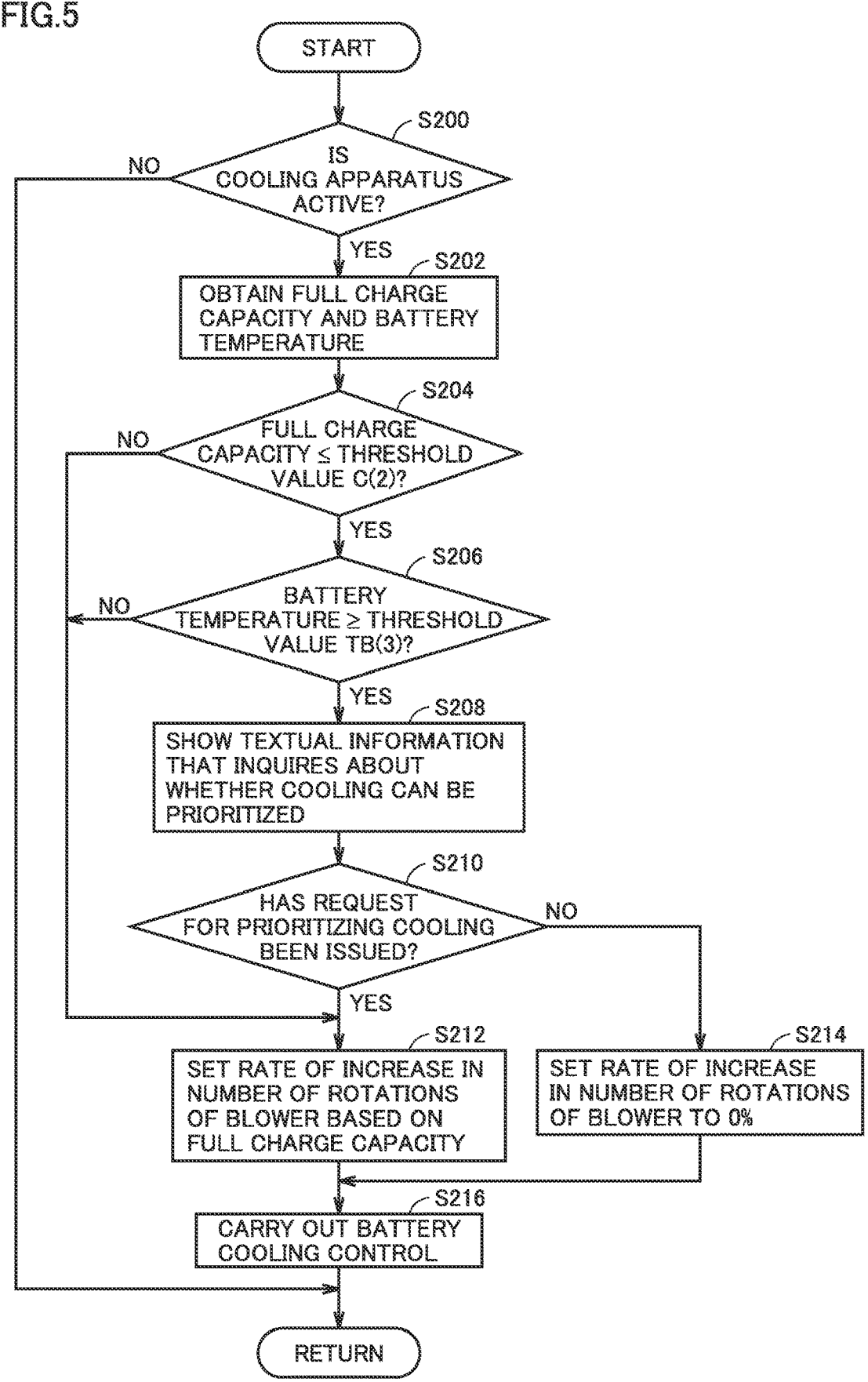
FIG. 5 is a flowchart showing exemplary processing for inquiring about whether or not a performance level of a cooling apparatus can be raised.

Exemplary processing for inquiring about whether or not a performance level of cooling apparatus 400 can be raised will be described below with reference to FIG. 5. FIG. 5 is a flowchart showing exemplary processing for inquiring about whether or not a performance level of cooling apparatus 400 can be raised. A series of processing shown in this flowchart is repeatedly performed by ECU 300 every prescribed control period.

In S200, ECU 300 determines whether or not cooling apparatus 400 is active. For example, when the activation flag described above is on, ECU 300 may determine that cooling apparatus 400 is active, or when a control signal that activates the blower is being output to cooling apparatus 400, the ECU may determine that cooling apparatus 400 is active. When cooling apparatus 400 is determined as being active (YES in S200), the process proceeds to S202.

In S202, ECU 300 obtains the full charge capacity and battery temperature TB of battery assembly 100. Since the method of estimating the full charge capacity and the method of obtaining battery temperature TB are as described above, detailed description thereof will not be repeated.

In S204, ECU 300 determines whether or not the full charge capacity of battery assembly 100 is equal to or lower than a threshold value C(2). Threshold value C(2) is, for example, a predetermined value that represents a full charge capacity at which increase in quantity of cooling is desired due to increase in internal resistance as compared with an example where the full charge capacity is at an initial value, and is adapted to an appropriate value through experiments. When the full charge capacity is determined as being equal to or lower than threshold value C(2) (YES in S204), the process proceeds to S206.

In S206, ECU 300 determines whether or not battery temperature TB of battery assembly 100 is equal to or higher than a threshold value TB(3). Threshold value TB(3) is, for example, a predetermined value for determining whether or not battery assembly 100 is in a temperature region where increase in quantity of cooling of battery assembly 100 is required. Threshold value TB(3) is adapted to an appropriate value through experiments. When battery temperature TB of battery assembly 100 is determined as being equal to or higher than threshold value TB(3) (YES in S206), the process proceeds to S208.

In S208, ECU 300 controls display apparatus 450 to show textual information that inquires about whether or not cooling can be prioritized. For example, ECU 300 controls display apparatus 450 to show various types of textual information on the display screen, similarly to the representation shown in FIG. 3. Specifically, for example, ECU 300 controls display apparatus 450 to show textual information "may cooling of battery be prioritized?" that inquires about whether or not cooling can be prioritized, in a region in the display screen corresponding to first region 451 in FIG. 3. The textual information that inquires about whether or not cooling can be prioritized is not particularly limited to the textual information described above.

In addition to the textual information that inquires about whether or not cooling can be prioritized, ECU 300 controls display apparatus 450 to show textual information representing an advantage derived from prioritization of battery cooling and textual information representing a disadvantage derived from prioritization of battery cooling in respective regions on the display screen corresponding to second region 452 and third region 453 in FIG. 3. The information that represents the advantage may include, for example, textual information "deterioration of battery can be suppressed." The information that represents the disadvantage may include, for example, textual information "operating noise may be noticeable."

Furthermore, ECU 300 controls display apparatus 450 to show the image including a rectangular frame and textual information "YES" within the rectangular frame and the image including a rectangular frame and textual information "NO" in the rectangular frame, in respective regions on the display screen corresponding to fourth region 454 and fifth region 455 in FIG. 3.

In S210, ECU 300 determines whether or not a request for prioritizing cooling has been issued. For example, when a user performs a touch operation onto a position corresponding to an image within a region corresponding to fourth region 454 on the touch panel representing operation apparatus 460, ECU 300 may determine that a request for prioritizing cooling has been issued. In addition, for example, when a user performs a touch operation onto a position corresponding to an image within a region corresponding to fifth region 455 on the touch panel representing operation apparatus 460, ECU 300 may determine that no request for prioritizing cooling has been issued. When it is determined that a request for prioritizing cooling has been issued (YES in S210), the process proceeds to S212.

In S212, ECU 300 sets a rate of increase in number of rotations of the blower based on the full charge capacity. ECU 300 sets the rate of increase in number of rotations of the blower based on the obtained full charge capacity and a predetermined map that shows relation between the full charge capacity and the rate of increase in number of rotations of the blower.

FIG. 6 is a diagram showing in a table format, an exemplary predetermined map showing relation between a full charge capacity and a rate of increase in number of rotations of the blower. As shown in FIG. 6, for the full charge capacities of 30 Ah, 25 Ah, 20 Ah, 15 Ah, and 10 Ah, 0%, 10%, 20%, 50%, and 100% are set as the rates of increase in number of rotations of the blower, respectively. In other words, the predetermined map in FIG. 6 shows that the rate of increase in number of rotations of the blower is higher as the full charge capacity is lower. Though an example in which the full charge capacity and the rate of increase in number of rotations of the blower satisfy non-linear relation in the predetermined map shown in FIG. 6 is described by way of example, relation is not particularly limited to non-linear relation and may be linear.

ECU 300 sets the rate of increase in number of rotations of the blower corresponding to the full charge capacity obtained based on the predetermined map. When the obtained full charge capacity has a value between two values of the full charge capacity shown in FIG. 6, ECU 300 sets the rate of increase in number of rotations of the blower corresponding to the full charge capacity obtained by linear interpolation. When it is determined that no request for prioritizing cooling has been issued (NO in S210), the process proceeds to S214.

In S214, ECU 300 sets the rate of increase in number of rotations of the blower to 0%. After processing in S212 or S214, the process proceeds to S216.

In S216, ECU 300 carries out battery cooling control using the set rate of increase in number of rotations of the blower. For example, ECU 300 controls cooling apparatus 400 to set the number of rotations of the blower calculated by adding an increment set for the number of rotations of the blower determined by battery temperature TB. For example, when 0% is set as the rate of increase in number of rotations of the blower, the increment is zero and hence ECU 300 controls cooling apparatus 400 to set the number of rotations of the blower determined by battery temperature TB. Alternatively, for example, when 100% is set as the rate of increase in number of rotations of the blower, an increment is set to a value equal to the number of rotations of the blower determined by battery temperature TB. Therefore, ECU 300 controls cooling apparatus 400 to set the number of rotations of the blower twice as large as the number of rotations of blower determined by battery temperature TB.

When cooling apparatus 400 is determined as not being active (NO in S200), the process ends. When the full charge capacity is determined as being higher than threshold value C(2) (NO in S204) or when battery temperature TB is lower than threshold value TB(3) (NO in S206), the process proceeds to S212. When the battery temperature is lower than threshold value TB(3), 0% is substantially set as the rate of increase in number of rotations of the blower.

An operation of ECU 300 that controls the cooling system for the power storage in the present embodiment, based on the structure and the flowchart as above, will be described.

For example, an example in which cooling apparatus 400 remains stopped is assumed. When cooling apparatus 400 remains stopped (YES in S100), the full charge capacity and battery temperature TB of battery assembly 100 are obtained (S102).

When battery temperature TB of battery assembly 100 is lower than threshold value TB(2) (NO in S108) even when obtained battery temperature TB is equal to or lower than threshold value TB(1) (YES in S104) and the full charge capacity is equal to or lower than threshold value C(1) (YES in S106), the standstill state of cooling apparatus 400 is maintained (S116).

When obtained battery temperature TB is equal to or lower than threshold value TB(1) (YES in S104), when the full charge capacity is equal to or lower than threshold value C(1) (YES in S106), and when battery temperature TB of battery assembly 100 is equal to or higher than threshold value TB(2) (YES in S108), textual information that inquires about whether or not cooling can be carried out is shown in first region 451 on the display screen of display apparatus 450 as shown in FIG. 3 (S110).

When it is determined that a request for carrying out cooling of battery assembly 100 has been issued by the touch operation by the user onto the region corresponding to fourth region 454 in display apparatus 450 on the touch panel representing operation apparatus 460 (YES in S112), battery cooling control is carried out (S114) and cooling apparatus 400 is activated.

When it is determined that no request for carrying out cooling of battery assembly 100 has been issued by the touch operation by the user onto the region corresponding to fifth region 455 in display apparatus 450 on the touch panel (NO in S112), the standstill state of cooling apparatus 400 is continued (S116).

When it is determined that the high-temperature state has been set where battery temperature TB of battery assembly 100 is higher than threshold value TB(1) (NO in S104), battery cooling control is carried out without inquiry information being shown on display apparatus 450 (S118). Then, textual information notifying that forced cooling has been carried out is shown on the display screen of display apparatus 450 as shown in FIG. 4 (S120).

Then, an example in which cooling apparatus 400 is active is assumed. When cooling apparatus 400 is active (YES in S200), the full charge capacity and battery temperature TB of battery assembly 100 are obtained (S202).

When the obtained full charge capacity is equal to or lower than threshold value C(2) (YES in S204) and when battery temperature TB of battery assembly 100 is equal to or higher than threshold value TB(3) (YES in S206), textual information that inquires about whether or not cooling can be prioritized is shown on the display screen of display apparatus 450 (S208).

When it is determined that a request for prioritizing cooling of battery assembly 100 has been issued by the touch operation by the user onto the region corresponding to fourth region 454 on the touch panel (YES in S210), the rate of increase in number of rotations of the blower is set based on the obtained full charge capacity and the predetermined map shown in FIG. 6 (S212). As battery cooling control is carried out, cooling apparatus 400 is controlled such that the number of rotations corresponding to the set rate of increase is added to the number of rotations of the blower determined by battery temperature TB to thereby set the calculated number of rotations of the blower (S216).

When it is determined that no request for prioritizing cooling of battery assembly 100 has been issued by the touch operation by the user onto the region corresponding to fifth region 455 on the touch panel (NO in S210), zero is set as the rate of increase in number of rotations of the blower (S214). Therefore, cooling apparatus 400 is controlled such that the number of rotations of the blower determined by battery temperature TB is set as a result of execution of battery cooling control (S216).

When the obtained full charge capacity is higher than threshold value C(2) (NO in S204) or when battery temperature TB of battery assembly 100 is lower than threshold value TB(3) (NO in S206), the rate of increase in number of rotations of the blower is set based on the obtained full charge capacity (S212). Then, cooling apparatus 400 is controlled such that the number of rotations of the blower calculated by adding the set increment to the number of rotations of the blower determined by battery temperature TB is set, without textual information being shown on display apparatus 450. Battery assembly 100 that generates heat due to increase in internal resistance can thus appropriately be cooled.

As set forth above, according to the cooling system for the power storage according to the present embodiment, when the execution condition including the condition that battery temperature TB of battery assembly 100 is equal to or lower than threshold value TB(1) is satisfied while cooling apparatus 400 remains stopped, an inquiry about whether or not cooling of battery assembly 100 with cooling apparatus 400 can be carried out is issued to a user through display apparatus 450. Control of cooling apparatus 400 as requested by the user can thus be carried out. Therefore, for example, when a request for carrying out battery cooling is issued by an operation onto operation apparatus 460 by the user, battery cooling control is carried out and battery assembly 100 can be longer in life. When no request for carrying out battery cooling is issued by an operation onto operation apparatus 460 by the user, the standstill state of cooling apparatus 400 is maintained and quiet performance during travel of vehicle 1 is maintained. Therefore, the cooling system capable of carrying out control in conformity with product characteristics on which the user places importance can be provided.

Furthermore, ECU 300 controls display apparatus 450 to show information that represents at least any of an advantage and a disadvantage in carrying out cooling, in addition to inquiry information. Therefore, the user can recognize the advantage and the disadvantage in carrying out cooling.

When battery assembly 100 is in an abnormal condition such as a high-temperature state, ECU 300 carries out cooling of battery assembly 100 with cooling apparatus 400 without inquiry information being shown on display apparatus 450. Therefore, when battery assembly 100 is in the abnormal condition, cooling of battery assembly 100 is forcibly carried out and hence possibility of failure or deterioration of battery assembly 100 can be lowered.

When ECU 300 has carried out cooling of battery assembly 100 with cooling apparatus 400 without inquiry information being shown on display apparatus 450, ECU 300 controls display apparatus 450 to show information showing that cooling of battery assembly 100 has been carried out. Therefore, strange feeling felt by the user due to activation of cooling apparatus 400 unintended by the user can be suppressed.

When the execution condition including the condition that the full charge capacity of battery assembly 100 is equal to or lower than threshold value C(2) and battery temperature TB of battery assembly 100 is equal to or higher than threshold value TB(3) is satisfied while cooling apparatus 400 is active, information that inquires about whether or not a performance level of cooling apparatus 400 can be raised is shown on display apparatus 450. Therefore, control of cooling apparatus 400 as requested by the user can be carried out.

A modification will be described below.

Though an electric vehicle is described as vehicle 1 by way of example in the embodiment above, the vehicle is not particularly limited to the electric vehicle, and the vehicle may be, for example, a hybrid vehicle incorporating an engine as a drive source or a power generation source in addition to MG 10.

Though vehicle 1 is configured such that electric power can be supplied and received between battery assembly 100 and MG 10 in the embodiment above, for example, vehicle 1 may be configured such that battery assembly 100 is chargeable with electric power supplied from a charging stand outside vehicle 1, in addition to the configuration described above.

Though a touch panel is adopted as operation apparatus 460 in the embodiment described above by way of example, for example, a switch including an operation member such as a button or a lever may be adopted instead of or in addition to the touch panel. In this case, for example, ECU 300 may determine that a request for carrying out cooling or prioritizing cooling is issued when a prescribed operation is performed on the switch after textual information is shown on display apparatus 450. The ECU may determine that no request for carrying out cooling or prioritizing cooling is issued unless a prescribed operation is performed on the switch during a period until lapse of a predetermined time period since representation of textual information.

Though various types of information are provided to a user by showing textual information on display apparatus 450 in the embodiment described above by way of example, various types of information may be provided to the user by audio output from a speaker (not shown) in the compartment of vehicle 1.

Though information that represents an advantage and information that represents a disadvantage in carrying out cooling are shown in addition to information that inquires about whether or not battery cooling can be carried out in the embodiment described above, at least any of the information that represents the advantage and the information that represents the disadvantage may be shown, for example, by showing only the information that represents the advantage or showing only the information that represents the disadvantage.

Though information that represents an advantage and information that represents a disadvantage in carrying out cooling are shown in addition to information that inquires about whether or not battery cooling can be carried out in the embodiment described above, at least any of information that represents an advantage and information that represents a disadvantage in not carrying out cooling may be shown. Thus, the user can recognize the advantage and the disadvantage in not carrying out cooling.

Though forced cooling of battery assembly 100 is carried out without inquiring about whether or not battery cooling can be carried out in an abnormal condition where battery assembly 100 is in the high-temperature state in which the battery temperature is higher than threshold value TB(1) in the embodiment described above, the abnormal condition of battery assembly 100 is not limited, for example, to the high-temperature state, and the abnormal condition may include an abnormal condition that requires cooling of battery assembly 100 such as a flow of an overcurrent through battery assembly 100 or an overvoltage in battery assembly 100 in addition to or instead of the high-temperature state.

Though a configuration including a blower that supplies air in the compartment into battery assembly 100 is described as exemplary cooling apparatus 400 in the embodiment above, limitation to such a configuration is not particularly intended. For example, cooling apparatus 400 may include a medium path provided adjacently to battery assembly 100 as being branched from a refrigerant path downstream from an expansion valve in a refrigeration cycle included in an air-conditioner provided in the compartment of vehicle 1 and a regulation valve that regulates an amount of refrigerant that flows through the medium path. In this case, ECU 300 adjusts a performance level of cooling apparatus 400 by adjusting a ratio of refrigerant supplied to the air-conditioner and a ratio of refrigerant supplied to battery assembly 100 to a total flow rate of refrigerant during a predetermined period by adjusting opening of the regulation valve in accordance with battery temperature TB.

Figure 7:
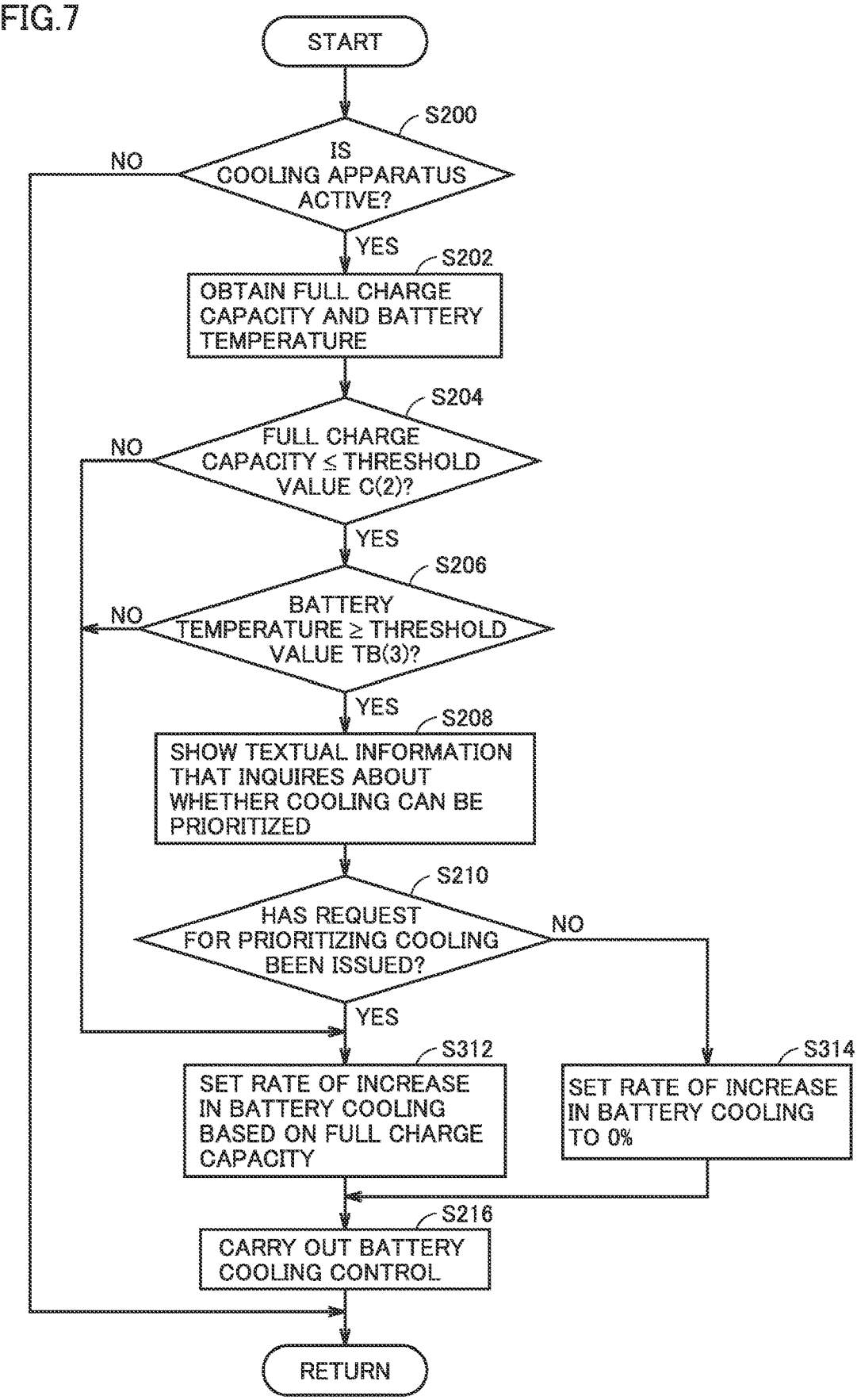
FIG. 7 is a flowchart showing exemplary processing for inquiring about whether or not battery cooling can be prioritized in a modification.

FIG. 7 is a flowchart showing exemplary processing for inquiring about whether or not battery cooling can be prioritized in a modification. The flowchart shown in FIG. 7 is different from the flowchart shown in FIG. 5 in performing processing in S312 and S314 instead of S212 and S214. Since processing is otherwise the same as the processing in the flowchart shown in FIG. 5 except for below and the same processing has the same step number allotted, detailed description thereof will not be repeated.

In S312, ECU 300 sets a rate of increase in battery cooling based on the full charge capacity. The rate of increase in battery cooling refers to an increment to the performance level of cooling apparatus 400 determined by battery temperature TB. ECU 300 sets the rate of increase in battery cooling based on the obtained full charge capacity and a predetermined map that shows relation between the full charge capacity and the rate of increase in battery cooling.

FIG. 8 is a diagram showing in a table format, an exemplary predetermined map showing relation between a full charge capacity and a rate of increase in battery cooling. As shown in FIG. 8, for the full charge capacities of 30 Ah, 25 Ah, 20 Ah, 15 Ah, and 10 Ah, 0%, 10%, 20%, 50%, and 100% are set as the rates of increase in battery cooling, respectively. In other words, the predetermined map shown in FIG. 8 shows that the rate of increase in battery cooling is higher as the full charge capacity is lower. Though an example in which the full charge capacity and the rate of increase in battery cooling satisfy non-linear relation in the predetermined map shown in FIG. 8 is described by way of example, relation is not particularly limited to non-linear relation and may be linear.

ECU 300 sets the rate of increase in battery cooling corresponding to the full charge capacity obtained based on the predetermined map. When the obtained full charge capacity has a value between two values of the full charge capacity shown in FIG. 8, ECU 300 sets the rate of increase in battery cooling corresponding to the full charge capacity obtained by linear interpolation.

In S314, ECU 300 sets the rate of increase in battery cooling to 0%. After processing in S312 or S314, the process proceeds to S216.

By doing so as well, when a user requests for prioritization of cooling of battery assembly 100 in response to textual information that inquires about whether or not cooling can be prioritized, control of cooling apparatus 400 as requested by the user can be carried out to thereby cool battery assembly 100.

Though an inquiry about whether or not battery cooling can be carried out is issued when battery temperature TB is equal to or lower than threshold value TB(1) and higher than threshold value TB(2) in the embodiment described above, for example, an inquiry about whether or not battery cooling can be carried out may be issued when battery temperature TB is at least equal to or lower than threshold value TB(1).

Figure 9:
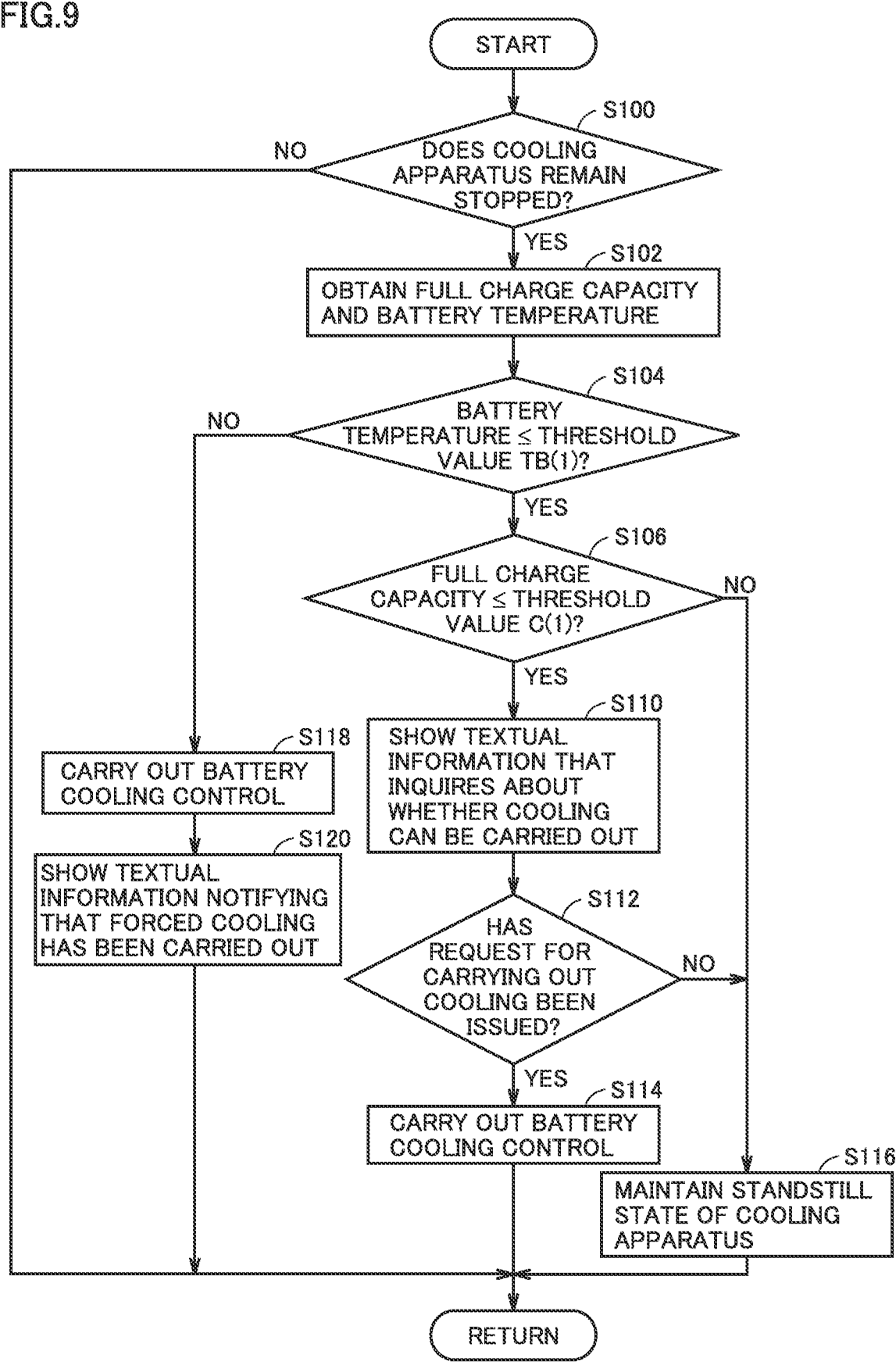
FIG. 9 is a flowchart showing exemplary processing for inquiring about whether or not battery cooling can be carried out in a modification.

FIG. 9 is a flowchart showing exemplary processing for inquiring about whether or not battery cooling can be carried out in a modification. The flowchart shown in FIG. 9 is different from the flowchart shown in FIG. 2 in that processing (S108) for determining whether or not battery temperature TB is equal to or higher than threshold value TB(2) is omitted. Since processing is otherwise the same as the processing in the flowchart shown in FIG. 2 and the same processing has the same step number allotted, detailed description thereof will not be repeated. Control of the cooling apparatus as requested by a user can thus also be carried out.

Though battery cooling control is carried out without inquiring about whether or not battery cooling can be carried out when battery temperature TB is higher than threshold value TB(1) in the embodiment described above, for example, when battery assembly 100 is in an abnormal condition, forced cooling of battery assembly 100 may be carried out without inquiring about whether or not battery cooling can be carried out.

Figure 10:
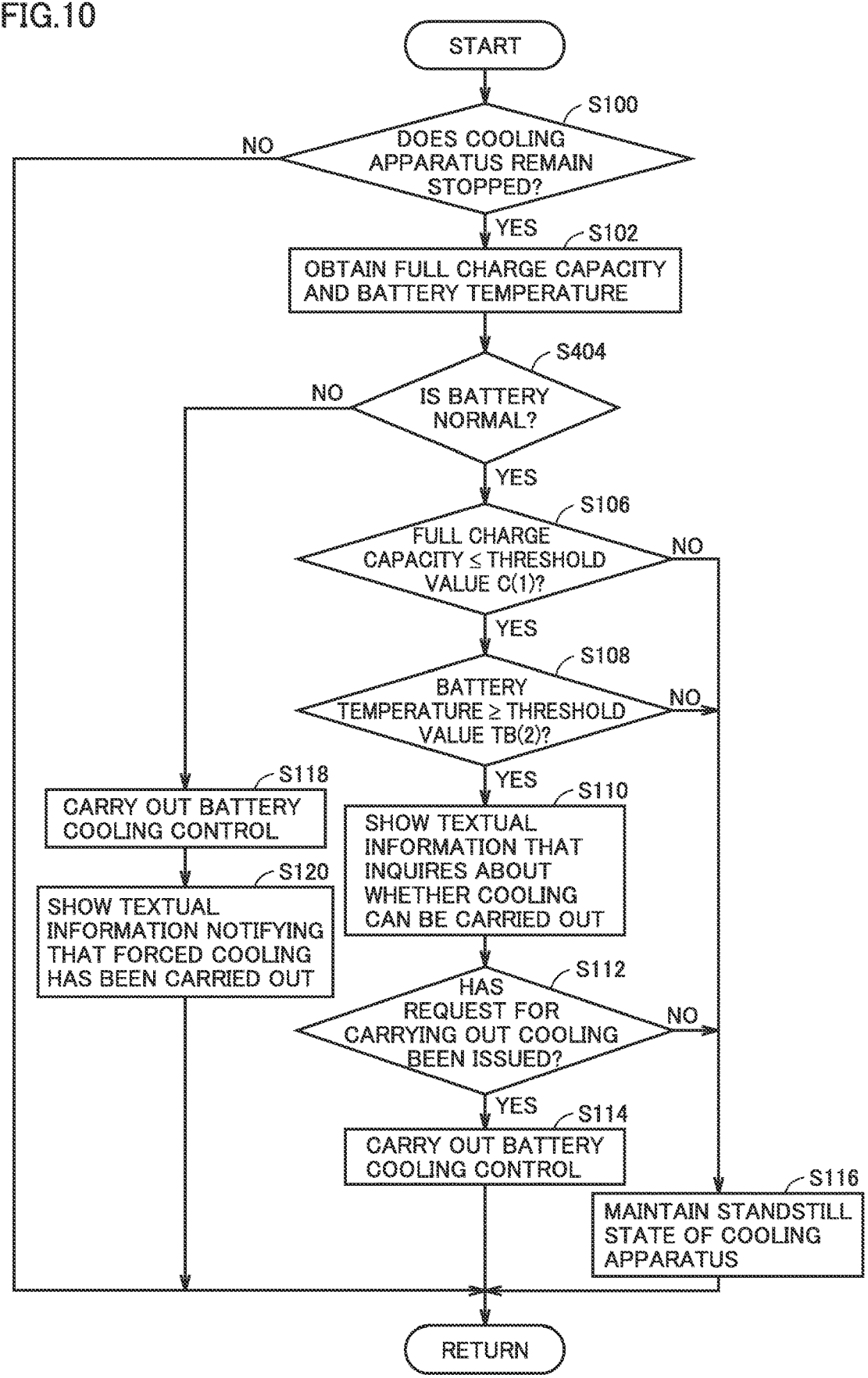
FIG. 10 is a flowchart showing exemplary processing for inquiring about whether or not battery cooling can be carried out in another modification.

FIG. 10 is a flowchart showing exemplary processing for inquiring about whether or not battery cooling can be carried out in another modification. The flowchart shown in FIG. 10 is different from the flowchart shown in FIG. 2 in that processing in S404 is performed instead of S104. Since processing is otherwise the same as the processing in the flowchart shown in FIG. 2 except for below and the same processing has the same step number allotted, detailed description thereof will not be repeated.

Specifically, when the full charge capacity and battery temperature TB are obtained, the process proceeds to S404. In S404, ECU 300 determines whether or not the battery is normal. For example, when battery temperature TB is equal to or lower than threshold value TB(1), when a current from the battery is equal to or lower than a threshold value, and when a voltage is within a predetermined range, ECU 300 determines that the battery is normal. When the battery is determined as normal (YES in S404), the process proceeds to S106. When an abnormal condition requiring cooling of battery assembly 100 such as battery temperature TB being higher than threshold value TB(1), a current being higher than the threshold value, or the voltage being out of the predetermined range occurs, the battery is determined as being in the abnormal condition (NO in S404) and the process proceeds to S118. Since cooling of battery assembly 100 is thus forcibly carried out when battery assembly 100 is in the abnormal condition, possibility of failure or deterioration of battery assembly 100 can be lowered.

In the embodiment described above, in processing for inquiring about whether or not battery cooling can be prioritized, when the full charge capacity is higher than threshold value C(2) or when the battery temperature is lower than threshold value TB(3), the rate of increase in number of rotations of the blower or in battery cooling is set based on the full charge capacity. In such a case, however, for example, zero may be set as the rate of increase in number of rotations of the blower or in battery cooling.

In the embodiment described above, the execution condition on which determination is based while cooling apparatus 400 remains stopped includes a condition that battery temperature TB is equal to or lower than threshold value TB(1). The execution condition, however, should only relate to cooling of battery assembly 100 and it is not particularly limited to the condition that battery temperature TB is equal to or lower than threshold value TB(1). For example, the execution condition may include at least any of a condition that a temperature of a portion around battery assembly 100 is equal to or lower than a threshold value, a condition that a temperature of a medium that exchanges heat with battery assembly 100 is equal to or lower than a threshold value, and a condition that a duration of the standstill state of cooling apparatus 400 exceeds a threshold value.

In the embodiment described above, in processing for inquiring about whether or not battery cooling can be prioritized, when a request for prioritizing cooling has been issued, the rate of increase in number of rotations of the blower or in battery cooling is set based on the full charge capacity, and when prioritization of cooling has not been requested, the rate of increase in number of rotations of the blower or in battery cooling is set to 0%. An initial rate of increase in number of rotations of the blower or in battery cooling, however, may be set to 0%, and increase from 0% may be made when it is determined that a request for prioritizing cooling has been issued, or alternatively, an upper limit value of the rate of increase may be set, and when it is determined that prioritization of cooling has not been requested, decrease from the upper limit value may be made. Furthermore, the rate of increase in number of rotations of the blower or in battery cooling at the time when it is determined that a request for prioritizing cooling has been issued may be stored in memory 302 of ECU 300 as information that can be set by using a diagnosis tool at a distributor such as a dealer.

In the embodiment described above, when inquiry information is provided as the execution condition is satisfied while cooling apparatus 400 remains stopped and thereafter a cooling execution operation by a user is accepted in operation apparatus 460, it is determined that a request for carrying out cooling has been issued and battery cooling control is carried out. The user, however, may change setting, with the use of a diagnosis tool at a distributor such as a dealer, such that, after inquiry information is provided, battery cooling control is carried out, for example, when the full charge capacity is equal to or lower than threshold value C(1) and battery temperature TB is equal to or higher than threshold value TB(2). Alternatively, the user may change setting so as not to carry out battery cooling control or may change setting of various threshold values.

In the embodiment described above, when a cooling execution operation by the user is accepted in operation apparatus 460 after inquiry information is provided as the execution condition is satisfied while cooling apparatus 400 remains stopped, it is determined that a request for carrying out cooling has been issued and battery cooling control is carried out, and when a cooling non-execution operation is accepted after inquiry information is provided as the execution condition is satisfied while cooling apparatus 400 remains stopped, it is determined that no request for carrying out cooling has been issued and a standstill state of cooling apparatus 400 is maintained. For example, however, when the cooling execution operation or the cooling non-execution operation is accepted and thereafter the execution condition described above is no longer satisfied and thereafter satisfied again, the operation previously accepted by operation apparatus 460 may be retrieved and cooling of battery assembly 100 may be carried out or not carried out based on the operation previously accepted by operation apparatus 460.

Figure 11:
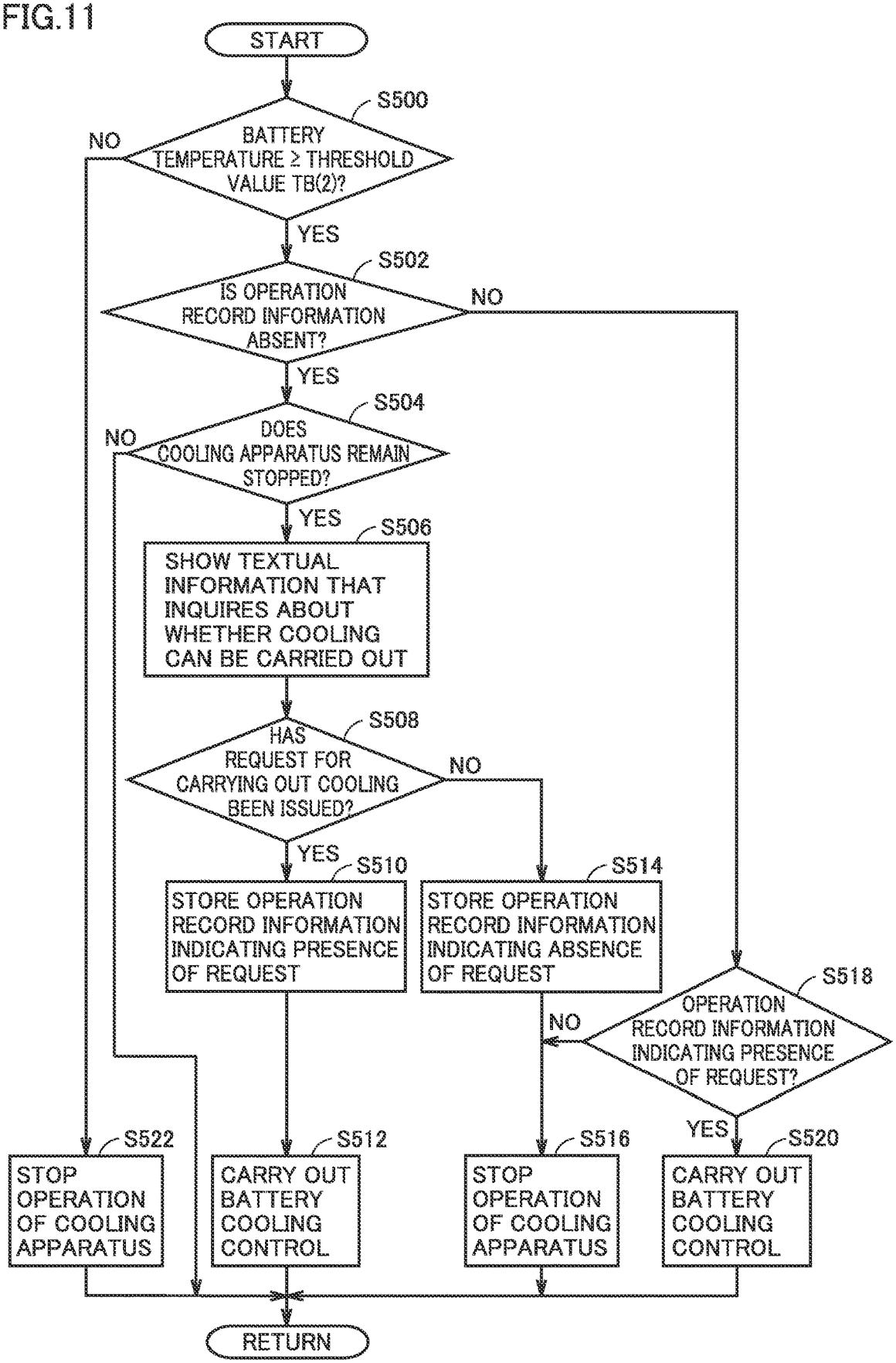
FIG. 11 is a flowchart showing exemplary processing for inquiring about whether or not battery cooling can be carried out in yet another modification.

FIG. 11 is a flowchart showing exemplary processing for inquiring about whether or not battery cooling can be carried out in yet another modification. A series of processing shown in this flowchart is repeatedly performed by ECU 300 every prescribed control period.

In S500, ECU 300 determines whether or not battery temperature TB of battery assembly 100 is equal to or higher than threshold value TB(2). Since threshold value TB(2) is as described above, detailed description thereof will not be repeated. When battery temperature TB of battery assembly 100 is determined as being equal to or higher than threshold value TB(2) (YES in S500), the process proceeds to S502.

In S502, ECU 300 determines whether or not operation record information is absent. The operation record information includes information showing that any of the cooling execution operation and the cooling non-execution operation has been performed after representation of textual information that inquires about whether or not cooling can be carried out as will be described later. When operation record information is determined as being absent (YES in S502), the process proceeds to S504.

In S504, ECU 300 determines whether or not cooling apparatus 400 remains stopped. Since processing in S504 is the same as the processing in S100 described above, detailed description thereof will not be repeated. When cooling apparatus 400 is determined as remaining stopped (YES in S504), the process proceeds to S506. When cooling apparatus 400 is determined as not remaining stopped (NO in S504), the process ends.

In S506, ECU 300 controls display apparatus 450 to show inquiry information. In S508, ECU 300 determines whether or not a request for carrying out cooling has been issued. When it is determined that a request for carrying out cooling has been issued (YES in S508), the process proceeds to S510. Since processing in S506 and S508 is the same as the processing in S110 and S112 described above, detailed description thereof will not be repeated.

In S510, ECU 300 has operation record information indicating presence of request stored. ECU 300 has memory 302 store information showing that it has received the cooling execution operation as operation record information indicating presence of the request.

In S512, ECU 300 carries out battery cooling control. Since processing in S512 is the same as the processing in S114 described above, detailed description thereof will not be repeated. When it is determined that no request for carrying out cooling has been issued (NO in S508), the process proceeds to S514.

In S514, ECU 300 has operation record information indicating absence of the request stored. ECU 300 has memory 302 store information showing that it has received the cooling non-execution operation as operation record information indicating absence of the request.

In S516, ECU 300 stops the operation of cooling apparatus 400. When cooling apparatus 400 remains stopped, ECU 300 maintains the standstill state of cooling apparatus 400. When it is determined that operation record information is present (NO in S502), the process proceeds to S518.

In S518, ECU 300 determines whether or not the operation record information falls under operation record information indicating presence of the request. When the operation record information is determined as falling under the operation record information indicating presence of the request (YES in S518), the process proceeds to S520.

In S520, ECU 300 carries out battery cooling control. While ECU 300 is carrying out battery cooling control, ECU 300 maintains the active state of cooling apparatus 400. When the operation record information is determined as not falling under the operation record information indicating presence of the request (NO in S518), the process proceeds to S516. When battery temperature TB is determined as being lower than threshold value TB(2) (NO in S500), the process proceeds to S522. In S522, ECU 300 stops the operation of cooling apparatus 400.

Depending on a state of battery assembly 100, satisfaction and non-satisfaction of the execution condition (that is, the condition that battery temperature TB is equal to or higher than threshold value TB(2)) described above may frequently be repeated. Providing a user with inquiry information each time the execution condition is satisfied may make the user feel bothered, and product characteristics as preferred by the user may not be achieved. Therefore, when the execution condition is thus satisfied again, cooling of battery assembly 100 is carried out or not carried out as following the previous operation, so that control of cooling system 2 further in conformity with product characteristics on which the user places importance can be provided. The execution condition may include a condition relating to the full charge capacity in addition to the condition relating to battery temperature TB.

In the embodiment described above, when the cooling execution operation by the user is accepted in operation apparatus 460 after inquiry information is provided as the execution condition is satisfied while cooling apparatus 400 remains stopped, it is determined that a request for carrying out cooling has been issued and battery cooling control is carried out. In addition, when a cooling non-execution operation is accepted, it is determined that no request for carrying out cooling has been issued and the standstill state of cooling apparatus 400 is maintained. For example, when the cooling execution operation or the cooling non-execution operation is accepted in operation apparatus 460 and thereafter an operation is again accepted in operation apparatus 460, however, based on that operation, cooling of the power storage may be carried out or not carried out on condition that the execution condition is satisfied.

Figure 12:
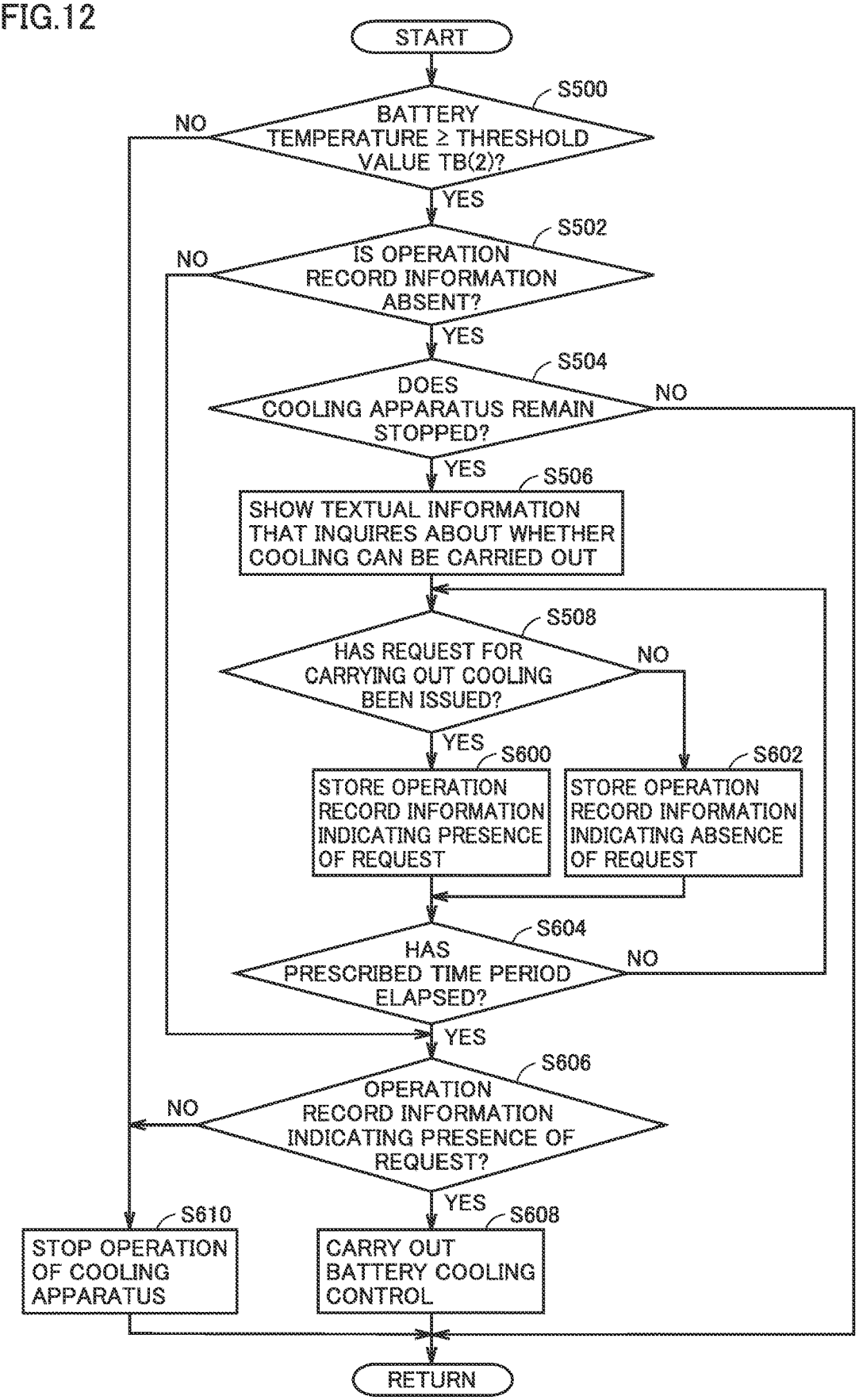
FIG. 12 is a flowchart showing exemplary processing for inquiring about whether or not battery cooling can be carried out in still another modification.

FIG. 12 is a flowchart showing exemplary processing for inquiring about whether or not battery cooling can be carried out in still another modification. The flowchart shown in FIG. 12 is different from the flowchart shown in FIG. 11 in that processing in S600, S602, S604, S606, S608, and S610 can be performed instead of processing in S510, S512, S514, S516, S518, S520, and S522. Since processing (specifically, processing in S500, S502, S504, S506, and S508 in FIG. 12) is otherwise the same as the processing shown in the flowchart in FIG. 11 except for below and the same processing has the same step number allotted, detailed description thereof will not be repeated.

When it is determined that a request for carrying out cooling has been issued (YES in S508), the process proceeds to S600, and when it is determined that no request for carrying out cooling has been issued (NO in S508), the process proceeds to S602.

In S600, ECU 300 has operation record information indicating presence of the request stored. When operation record information indicating absence of the request has been stored, ECU 300 updates the operation record information with the operation record information indicating presence of the request.

In S602, ECU 300 has operation record information indicating absence of the request stored. When operation record information indicating presence of the request has been stored, ECU 300 updates the operation record information with the operation record information indicating absence of the request.

In S604, ECU 300 determines whether or not a prescribed time period has elapsed since representation of inquiry information. The prescribed time period is a predetermined time period during which the cooling execution operation or the cooling non-execution operation is accepted. When it is determined that the prescribed time period has elapsed (YES in S604), the process proceeds to S606. When operation record information is determined as being present as well (NO in S502), the process proceeds to S606.

In S606, ECU 300 determines whether or not the operation record information falls under the operation record information indicating presence of the request. When it is determined that the operation record information falls under the operation record information indicating presence of the request (YES in S606), the process proceeds to S608.

In S608, ECU 300 carries out battery cooling control. While ECU 300 is carrying out battery cooling control, ECU 300 maintains the active state of cooling apparatus 400.

When battery temperature TB is determined as being lower than threshold value TB(2) (NO in S500) or when the operation record information is determined as not falling under the operation record information indicating presence of the request (NO in S606), the process proceeds to S610.

In S610, ECU 300 stops the operation of cooling apparatus 400. When cooling apparatus 400 remains stopped, ECU 300 maintains the standstill state of cooling apparatus 400.

For example, during a trip of vehicle 1, user's mind may change or the user may perform a misoperation, and the user may perform an operation different from an intended operation. The trip refers to a period from start-up of a system of vehicle 1 by a start-up operation until deactivation of the system of vehicle 1 by a deactivation operation. The start-up operation includes, for example, an operation of a start button (not shown) while the system of vehicle 1 is off. The deactivation operation includes, for example, an operation of the start button while the system of vehicle 1 is on.

If no change can be made from the previous operation in the event of change in mind or the misoperation described above, product characteristics as preferred by the user may not be achieved. Therefore, when an operation is again performed after the previous operation, cooling is carried out or not carried out based on the latest operation, so that control of the cooling system further in conformity with product characteristics on which the user places importance can be provided.

When operation record information remains in memory 302 at the time of the end of a trip of vehicle 1, execution or non-execution of cooling continues thereafter based on that information and product characteristics as preferred by a user may not be achieved. Therefore, such information may be reset (operation record information stored in memory 302 may be cleared) when the trip of vehicle 1 ends.

Such a situation that execution or non-execution of cooling is continued based on information on an initial operation can thus be avoided and control of a cooling system further in conformity with product characteristics on which a user places importance can be provided.

The entirety or a part of the modification may be carried out as being combined.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A cooling system for a power storage, the power storage being used for supply of electric power to a drive source of a vehicle, the cooling system comprising:
   a cooling apparatus that cools the power storage;
   a notification apparatus that provides prescribed information in a compartment of the vehicle; and
   an electronic control unit (ECU) programmed to:
   control the cooling apparatus and the notification apparatus,
   obtain a full charge capacity of the power storage, wherein
   based upon (i) an execution condition relating to cooling of the power storage being satisfied during stoppage of the cooling apparatus, and (ii) the full charge capacity being equal to or lower than a prescribed threshold value, provide inquiry information through the notification apparatus, the inquiry information representing whether cooling of the power storage with the cooling apparatus is carried out.

2. The cooling system according to claim 1, wherein
   the execution condition includes a condition that a temperature of the power storage is equal to or lower than a first temperature.

3. The cooling system according to claim 1, further comprising an operation apparatus that accepts an operation by a user, wherein
   when the operation apparatus accepts a cooling execution operation that requests for execution of cooling of the power storage in response to the inquiry information, the ECU carries out cooling of the power storage with the cooling apparatus.

4. The cooling system according to claim 1, further comprising an operation apparatus that accepts an operation by a user, wherein
   when the operation apparatus accepts a cooling non-execution operation that requests for non-execution of cooling of the power storage in response to the inquiry information, the ECU does not carry out cooling of the power storage with the cooling apparatus.

5. The cooling system according to claim 3, wherein
   when the operation apparatus accepts the cooling execution operation and then the execution condition is not satisfied and again satisfied, the cooling execution operation accepted by the operation apparatus is retrieved and the ECU carries out cooling of the power storage based on the cooling execution operation accepted again by the operation apparatus, and
   when the operation apparatus accepts a cooling non-execution operation and then the execution condition is not satisfied and again satisfied, the cooling non-execution operation accepted by the operation apparatus is retrieved and the ECU does not carry out cooling of the power storage based on the cooling non-execution operation accepted again by the operation apparatus.

6. The cooling system according to claim 3, wherein
   when trip of the vehicle ends, the ECU resets information representing the operation previously accepted by the operation apparatus.

7. The cooling system according to claim 5, wherein
   when the operation apparatus accepts the cooling execution operation and then accepts an additional operation, based on the additional operation, the ECU carries out cooling of the power storage on condition that the execution condition is satisfied, and
   when the operation apparatus accepts the cooling non-execution operation and then accepts an additional operation, based on the additional operation, the ECU does not carry out cooling of the power storage on condition that the execution condition is satisfied.

8. The cooling system according to claim 1, wherein
   when the power storage is in an abnormal condition, the ECU carries out cooling of the power storage with the cooling apparatus without providing the inquiry information, wherein the abnormal condition is at least one of: a battery temperature above a predetermined temperature threshold, a determination that the battery is in an overvoltage state, or a determination that the battery has a flow of an overcurrent.

9. The cooling system according to claim 1, wherein
   when a temperature of the power storage is equal to or lower than a first temperature and higher than a second temperature, the ECU provides the inquiry information, and
   when the temperature of the power storage is higher than the first temperature, the ECU carries out cooling of the power storage with the cooling apparatus without providing the inquiry information.

10. The cooling system according to claim 1, wherein the ECU provides information that represents at least any of an advantage and a disadvantage in carrying out cooling, in addition to the inquiry information.

11. The cooling system according to claim 1, wherein the ECU provides information that represents at least any of an advantage and a disadvantage in not carrying out cooling, in addition to the inquiry information.

12. The cooling system according to claim 8, wherein when the ECU has carried out cooling of the power storage with the cooling apparatus without providing the inquiry information, the ECU provides, through the notification apparatus, information indicating that cooling of the power storage has been carried out.

13. The cooling system according to claim 1, wherein when the execution condition is satisfied during cooling by the cooling apparatus, the ECU provides, through the notification apparatus, information that inquires about whether a performance level of the cooling apparatus can be raised.

* * * * *